INVENTOR.
Robert B. Trousdale
BY
T. L. Bowes
Atty.

MULTI-FREQUENCY RINGING MACHINE

Filed April 15, 1953 5 Sheets-Sheet 2

INVENTOR.
Robert B. Trousdale
BY
J. L. Bowes
Atty.

May 13, 1958 R. B. TROUSDALE 2,834,954

MULTI-FREQUENCY RINGING MACHINE

Filed April 15, 1953 5 Sheets-Sheet 3

INVENTOR.
Robert B. Trousdale
BY
J. L. Bowes
Atty.

May 13, 1958 R. B. TROUSDALE 2,834,954

MULTI-FREQUENCY RINGING MACHINE

Filed April 15, 1953 5 Sheets-Sheet 4

INVENTOR.
Robert B. Trousdale
BY
T. L. Bowes
Atty.

INVENTOR.
Robert B. Trousdale
BY
T. L. Bowes
Atty.

2,834,954

MULTI-FREQUENCY RINGING MACHINE

Robert B. Trousdale, Webster, N. Y., assignor, by mesne assignments, to General Dynamics Corporation, a corporation of Delaware Application April 15, 1953, Serial No. 348,862

7 Claims. (Cl. 340—248)

Figure 1:
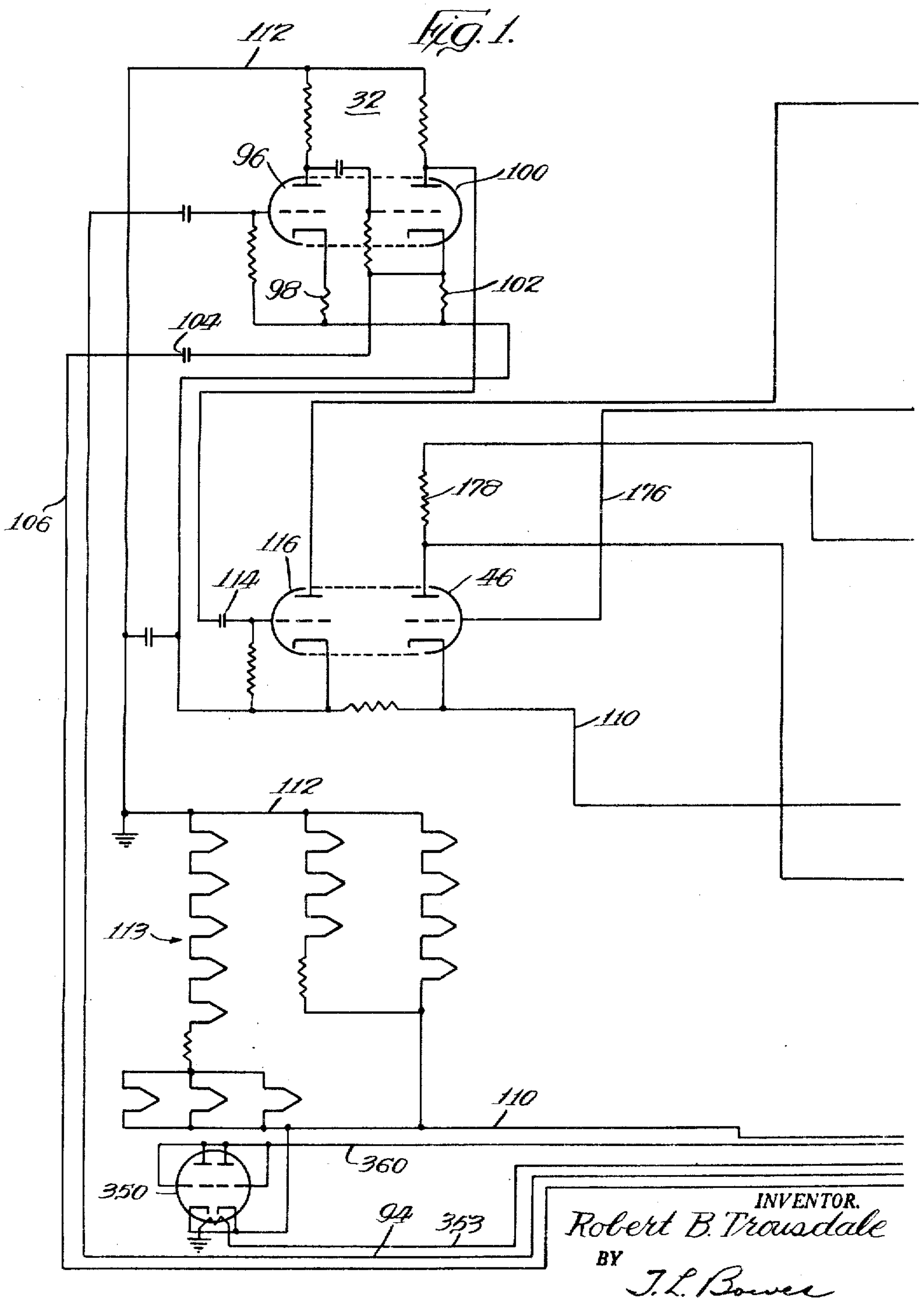
Figure 2:
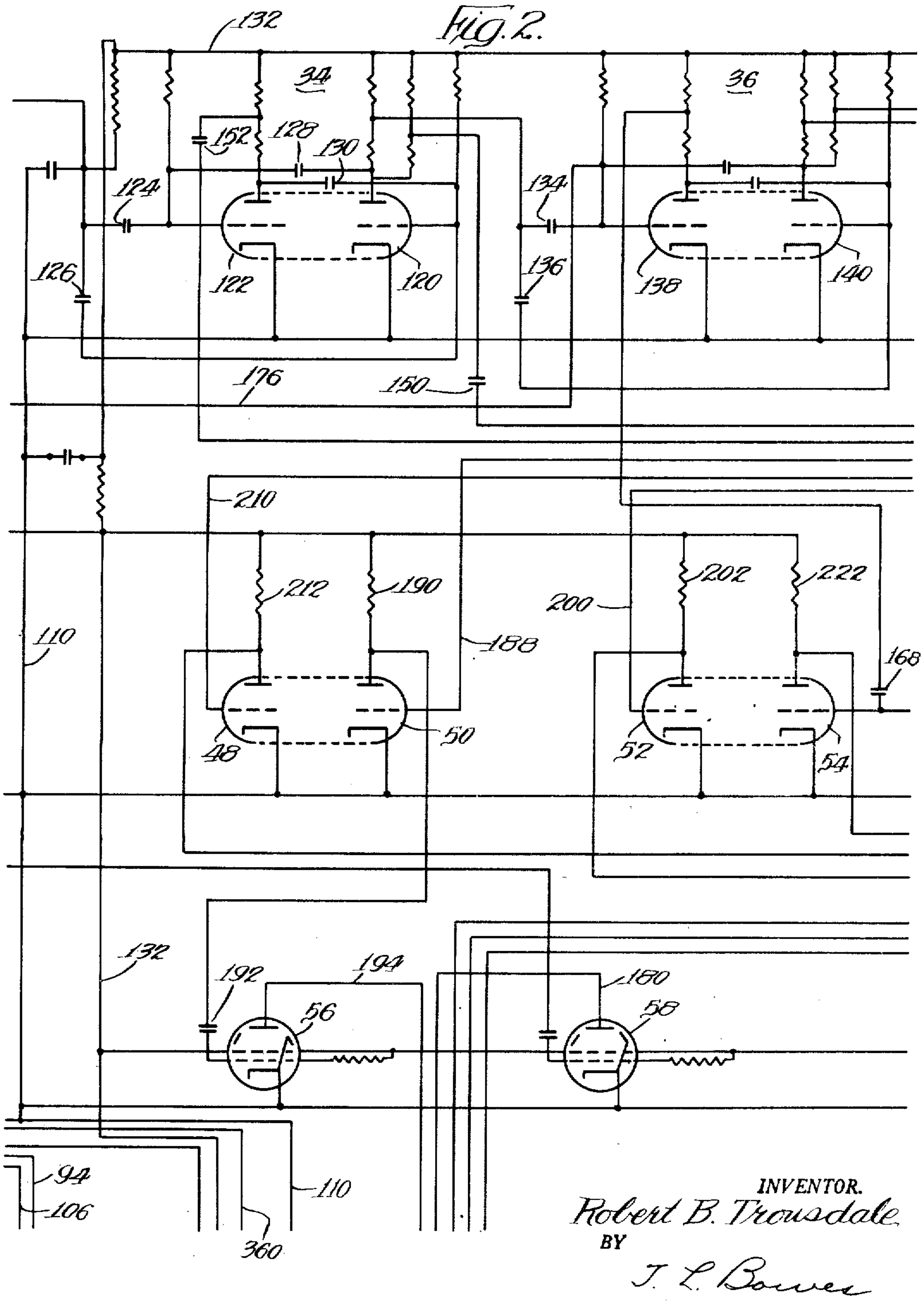
Figure 3:
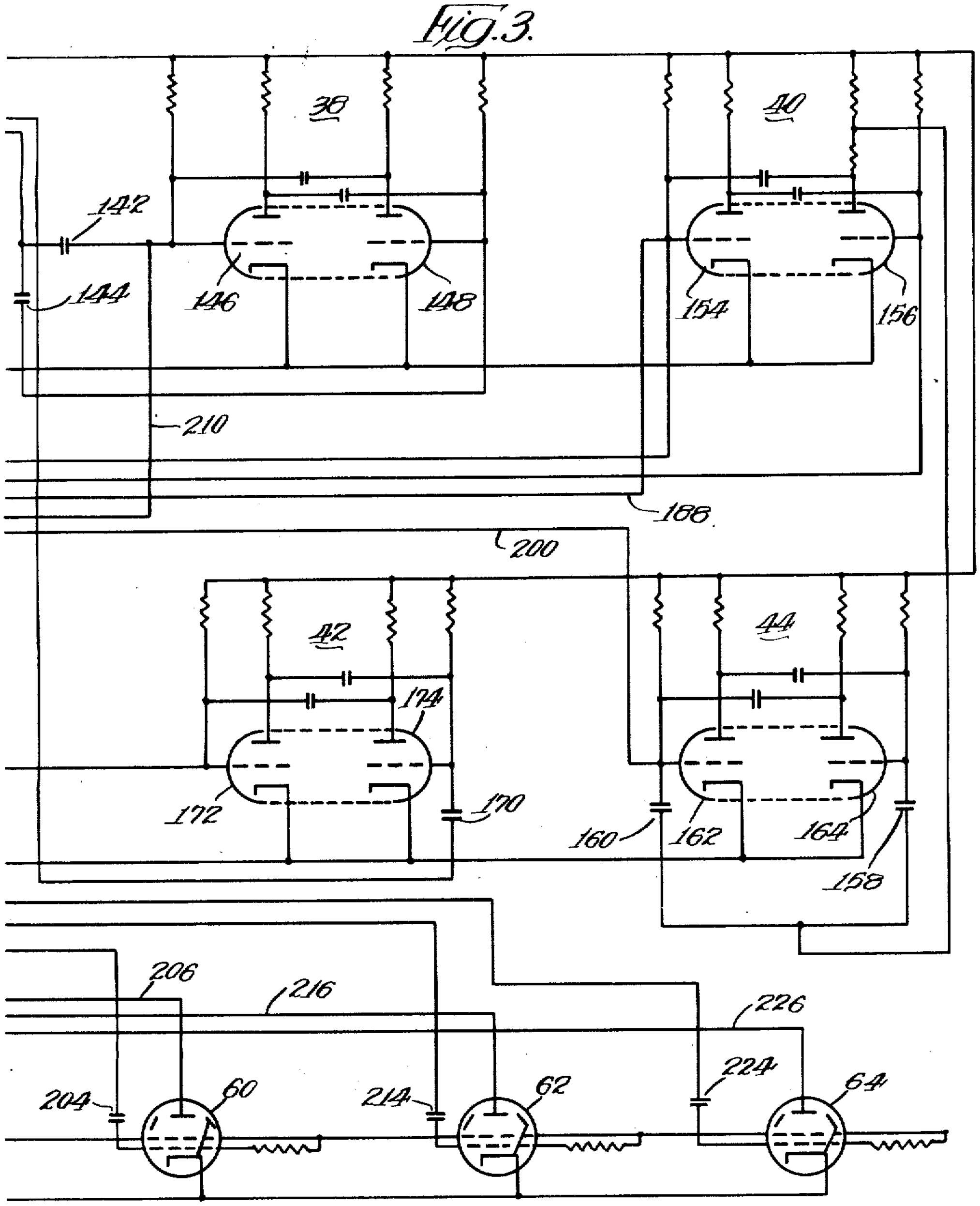

This invention relates to a multi-frequency voltage generator and, more particularly, to a ringing machine for generating voltages of different ringing frequencies for use in telephone systems.

Present generators utilized in selectively supplying harmonically related ringing frequencies in party line telephone systems are either of the electromechanical or the mechanical type and, accordingly, are cumbersome and require large amounts of physical space for proper installation in central office facilities. It is very difficult to regulate the operating frequencies of these types of ringing machines, and, in order to adequately insure that only the desired ringing frequencies are coupled to the subscribers' lines, it is often necessary to utilize accurately wound transformers and expensive filtering networks. Also, the electromechanical vibration converters are subject to the inherent disadvantage of utilizing moving mechanical parts which eventually must be replaced due to factors such as the deterioration of the contact members.

Prior attempts at providing accurate electronic multi-frequency generators for supplying ringing voltages have required the use of the conventional high voltage power supply desirable for stable operation of electronic components. These high voltage supplies are not available in existing central office equipment, and it is financially inexpedient to provide not only the necessary operating equipment for supplying the high voltage, but also the necessary standby equipment for providing this high voltage supply during commercial power failures so as to maintain telephone service. Another common disadvantage frequently experienced in the use of electronic multi-frequency generators is the failure of these generators to supply adequate power at the selected ringing frequencies when electronic components are operated at the low voltage of the battery power supplies available in existing telephone installations.

Accordingly, one object of this invention is to provide a ringing machine for telephone systems which utilizes electronic components for providing stable ringing voltages of accurately determined frequencies, and which machine is capable of delivering large output power.

Another object of this invention is the provision of an electronic multi-frequency voltage generator capable of operating on the station battery provided in conventional telephone offices and which requires no auxiliary equipment.

A still further object is the provision of a novel multi-frequency voltage generator for accurately generating ringing frequencies under the control of a single standard frequency source.

Another object of this invention is to provide a multi-frequency voltage generator which includes means for selectively preventing cross ringing between the different frequencies utilized in selectively ringing subscriber stations.

A still further object is the provision of an electronic ringing machine which is provided with a novel circuit for insuring proper operation of the ringing machine before the output thereof may be supplied to the telephone system.

Another object of this invention is the provision in a telephone system of a plurality of electronic ringing machines which may be selectively interconnected with the system to provide voltages of the desired ringing frequencies without a period of delay during which service is interrupted in the system.

In accordance with these and many other objects, a multi-frequency voltage generator is provided which includes a plurality of frequency dividing multivibrator circuits which are maintained in synchronism with a standard frequency source such as that provided by a tuning fork. The divided frequencies produced by the multivibrators are each coupled through an associated power amplifier and applied to the operating winding of a mercury contact relay. Each of the mercury contact relays is driven in accordance with the output frequency of its associated multivibrator so as to intermittently close the contacts controlled thereby. These contacts are interposed between a source of station battery and an output transformer having a center tap winding so that the intermittent operations of the mercury contact relays induce substantially equal and opposite flows of current through the primary windings of the output transformers. This alternate energization of the transformer produces a square wave having a frequency equal to that of the multivibrator driving the associated mercury contact relay, and these square waves are filtered and applied to the output terminals for use as a source of different ringing frequencies in a telephone system utilizing party subscriber lines.

The multi-frequency voltage generator is so designed as to be capable of being operated by the 48 volt battery provided in conventional telephone facilities, and, although the generator utilizes electronic components, the circuits utilizing these components have been so designed as to provide not only stable operation but also accurate output frequencies even though the operating voltages for these electronic components are lower than normally used. The output transformers intermittently energized under the control of the mercury relays are provided with taps on the secondary windings thereof so as to provide an anti-cross ringing feature so that each generated output frequency does not include a harmonic component of such magnitude as to energize a ringer other than that responsive to the selected ringing frequency. The generator is also provided with a novel control circuit to insure operation of the mercury contact relays prior to supplying any output to the transformer means so as to prevent the flow of undesirable surge currents of large magnitude through the output transformers.

Figure 6:
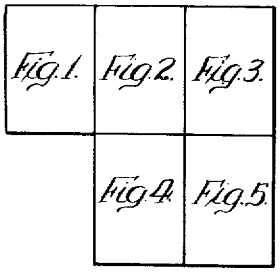

Many other objects and advantages of the present invention will become apparent from a consideration of the following specification when read in conjunction with the drawings wherein:

Figs. 1 to 5, inclusive, are shematic circuit diagrams of an electronic ringing machine empodying the present invention; and Fig. 6 is a block diagram showing the manner in which Figs. 1 to 5, inclusive, of the drawings are placed adjacent each other to form a single schematic diagram of the ringing machine.

In general the multi-frequency voltage generator includes a tuning fork assembly 30 (Fig. 4) which controls the frequency of operation of an oscillator 32 which is operated at 1200 C. P. S. to provide a standard frequency which is divided by a plurality of frequency dividing multivibrators 34, 36, 38, 40, 42 and 44 into a seelcted group of harmonically related frequencies which are utilized for selective party ringing on party subscriber lines. The subdivided frequency outputs provided by all of these multivibrators, with the exception of the multivibrator 34, are coupled through one of a plurality of amplifier tubes 46, 48, 50, 52, and 54 to drive a plurality of power pentodes 56, 58, 60, 62, and 64. The outputs of each of the power pentodes is applied to one of a plurality of mercury contacts relays 66, 68, 70, 72, and 74 so that the contacts controlled thereby are intermittently opened and closed to intermittently energize a plurality of output transformers 76, 78, 80, 82, and 84 so as to provide square waves at the output thereof having a frequency corresponding to the subdivided frequency of the multivibrator driving each of these transformers.

Figure 4:
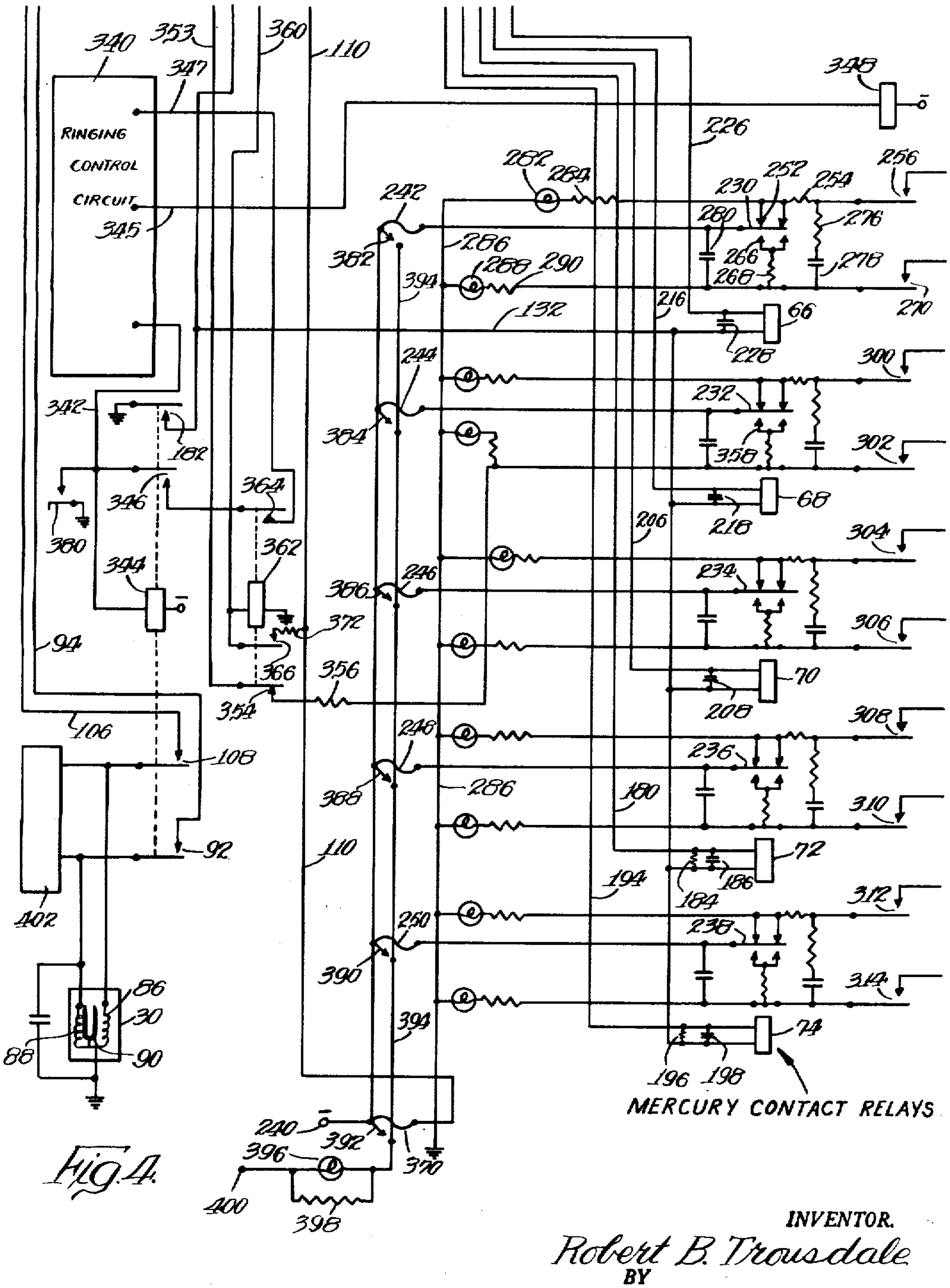
Figure 5:
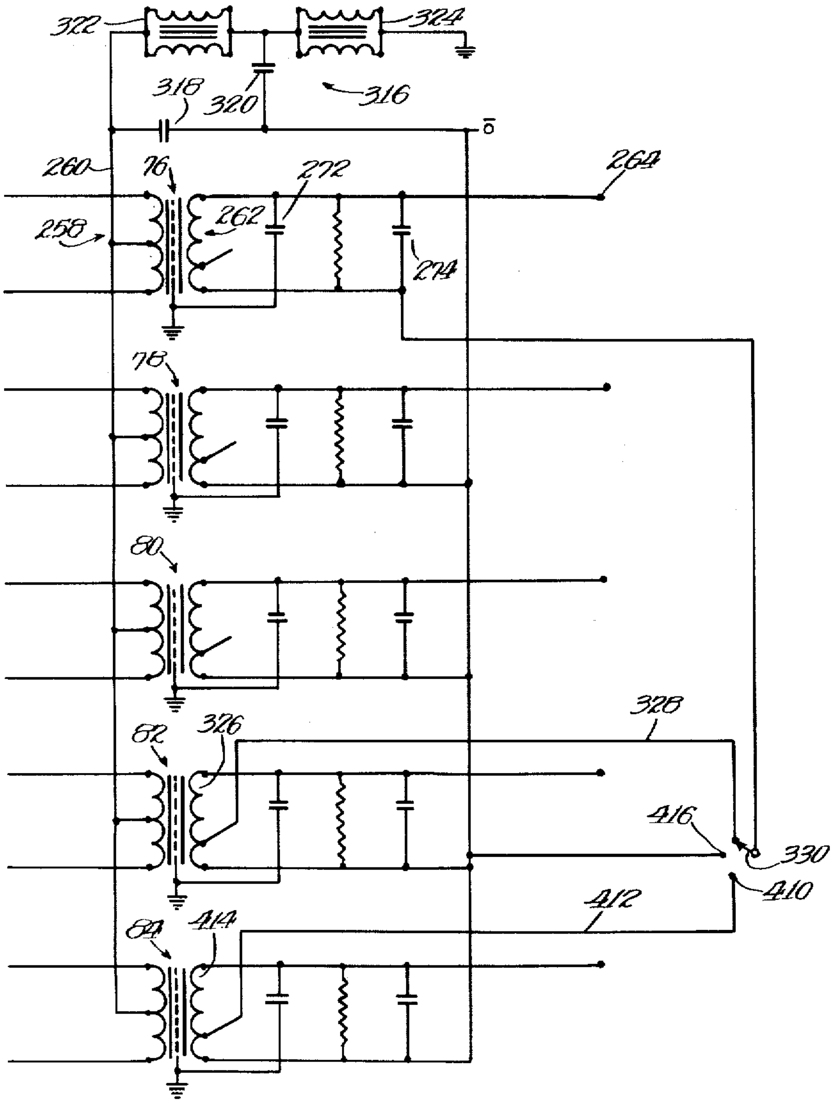

Referring now to Fig. 4 of the drawings, the tuning fork assembly 30 includes a driving coil 86, a pickup coil 88, and a tuning fork 90. The undulations of the fork 90 produce voltage variations in the pickup coil 88 which are transmitted through a normally closed pair of contacts 92 and a conductor 94 to the grid of an amplifier tube 96 having an unbypassed cathode resistor 98 and forming a portion of the standard frequency oscillator 32. The signal produced by the amplifier 96 is coupled to a cathode follower tube 100 also forming a portion of the standard frequency oscillator 32. The voltage developed across a resistor 102 connected to the cathode of the tube 100 is returned through a coupling condenser 104, a conductor 106 and a normally closed pair of contacts 108 to the driving coil 86 of the tuning fork assembly 30 so as to maintain the fork 90 in oscillation. The cathodes of the tubes 96 and 100 are conected to a 48 volt negative conductor 110 which is common to the entire multi-frequency generator, and the plates of the tubes 96 and 100 are connected to a grounded positive battery conductor 112 so that the oscillator 32 is provided with an operating voltage of approximately 48 volts. The filaments of the tubes, indicated generally as 113, included in the ringing machine are serially connected in a plurality of branches which are connected in parallel between the battery conductors 110 and 112 so that the filaments of all of these tubes are normally heated.

The 1200 C. P. S. voltage provided by the standard frequency oscillator 32 is coupled through a condenser 114 to the grid of an amplifier tube 116 and, following amplification therein, is coupled in the same phase to the control grids of a pair of tubes 120 and 122 forming the first frequency dividing multivibrator 34 through a pair of coupling condensers 124 and 126. A pair of grid-to-plate coupling condensers 128 and 130 in the frequency dividing multivibrator 34 and the grid resistors associated therewith are so chosen in value that the natural frequency of oscillation of the multivibrator 34 is approximately 200 C. P. S. Since the synchronizing voltage coupled to the multivibrator 34 from the standard frequency oscillator 32 is applied in like phase to the control grids of the tubes 120 and 122, the multivibrator 34 tends to operate on an even integral submultiple of the standard frequency which is 1200 C. P. S. or, in the case of the multivibrator 34, a frequency of 200 C. P. S.

The cathodes of the tubes 120 and 122 are directly connected to the common negative battery conductor 110 and the plates of the tubes 120 and 122 are connected through plate resistors to a ground conductor 132 which is common to the multi-frequency voltage generator. Therefore, the multi-vibrator 34 operates with an effective plate potential of 48 volts. In order to obtain adequate stability of operation of the multivibrator 34 at this low plate potential, it is necessary to utilize a very large plate impedance. By the use of a large plate impedance and by a suitable choice of the other circuit components forming the multivibrator 34, it is possible to obtain stable operation with the proper dividing ratio in a range of operating voltages extending between 15 and 90 volts. Accordingly, the multivibrator 34 provides a very stable frequency dividing multivibrator for reducing the standard frequency of 1200 C. P. S. provided by the oscillator 32 to a lower value which is further subdivided to provide the plurality of harmonic ringing frequencies utilized in this electronic ringing machine.

The 200 C. P. S. output voltage from the multivibrator 34 is transmitted through a pair of condensers 134 and 136 to the control grids of a pair of tubes 138 and 140 forming the frequency dividing multivibrator 36. The plate-to-grid coupling condensers for the tubes 138 and 140, together with the grid resistors associated therewith, are so chosen in magnitude that the natural frequency of oscillation of the multivibrator 36 is slightly less than 50 C. P. S. Since the synchronizing voltage injected from the multivibrator 34 is applied in like phase to both of the tubes 138 and 140, the multivibrator 36 tends to stabilize at an operating frequency which is an even integral submultiple of the injected frequency or, in this case, 50 C. P. S. The multivibrator 36 is similar in design to the multivibrator 34 in rather large plate impedances and is operated with the cathodes at 48 volts negative and with the plates at ground. The 50 C. P. S. signal provided by the multi-vibrator 36 is the first of the harmonically related ringing frequencies generated by the electronic ringing machine.

The 50 C. P. S. voltage provided by the multivibrator 36 is coupled through a pair of condensers 142 and 144 to be applied in like phase to the control grids of a pair of tubes 146 and 148 forming the frequency dividing multivibrator 38. The grid-to-plate coupling condensers and the grid resistors associated with the multivibrator 38 are so chosen in value that the natural frequency of oscillation of the multivibrator 38 is slightly less than 25 C. P. S. This frequency is maintained in synchronism with the 1200 C. P. S. voltage provided by the standard frequency oscillator 32 inasmuch as this frequency is an integral submultiple of the frequency of the injected synchronizing voltage provided by the multivibrator 36. The circuit design of the multivibrator 38 is similar to that of the multivibrators 34 and 36 including high plate impedances and is capable of maintaining a proper frequency division even though the plate voltage may vary from between 15 and 90 volts. The 25 C. P. S. voltage provided by the multivibrator 38 is the second of the harmonically related frequencies generated by the electronic ringing machine.

The 200 C. P. S. voltage developed by the frequency dividing multivibrator 34 is also transmitted through a pair of condensers 150 and 152 to the control electrodes of a pair of tubes 154 and 156, respectively, forming the multivibrator 40. The grid-to-plate coupling condensers and the associated grid resistors of the multivibrator 40 are so chosen in magnitude that the natural frequency of oscillation of the multivibrator 40 is slightly less than 66⅔ C. P. S. Since the voltage injected from the multivibrator 34 applied to the control grids of the tubes 154 and 156 is substantially 180 degrees out of phase, the oscillator 40 tends to operate at a frequency which is an odd integral submultiple of the injected frequency. The circuit design of the multivibrator 40 is similar in nature to that of the multivibrator 34 and, accordingly, provides a stable source of 66⅔ C. P. S. voltage which is the third of the harmonically related ringing frequencies to be provided by the electronic ringing machine.

The output of the multivibrator 40 is coupled through a pair of condensers 158 and 160 to the control electrodes of a pair of tubes 162 and 164 forming the frequency dividing multivibrator 44. The circuit components of the multivibrator 44 are selected so that the natural frequency of oscillation of this multivibrator is approximately 33⅓ C. P. S. Since the injected synchronizing voltage from the multivibrator 44 is applied in like phase to the control grids of the tubes forming the multivibrator 44, the frequency of operation thereof tends to be an even integral submultiple of the injected frequency or, in this case, 33⅓ C. P. S. which is one-half of the injected 66⅔ C. P. S. voltage. The circuit design of the multivibrator 44 is similar to that of the other multivibrators and, accordingly, provides a stable and accurate source of 33⅓ C. P. S. voltage which is the fourth of the harmonically related ringing frequencies provided by the electronic ringing machine.

The 50 C. P. S. voltage developed by the multivibrator 36 is transmitted through a pair of condensers 168 and 170 to the control grids of a pair of tubes 172 and 174 forming the multivibrator 42. The circuit constants of the multivibrator 42 are selected so that the natural frequency of oscillation of the multivibrator 42 is slightly less than 16⅔ C. P. S., and, since the synchronizing voltage is applied to the control grids of the tubes 172 and 174 substantially 180 degrees out of phase, the multivibrator 42 tends to operate at a frequency which is an odd integral submultiple of the injected 50 C. P. S. voltage or, in this case, 16⅔ C. P. S.

The circuit design of the multivibrator 42 is similar to that of the other frequency dividing multivibrators and, accordingly, provides a stable and accurate source of 16⅔ C. P. S. voltage which is maintained in synchronism with the 1200 C. P. S. voltage generated by the oscillator 32 and which is capable of maintaining this desired frequency throughout large ranges of variation in plate potential.

The power developed by the multivibrators 36, 38, 40, 42, and 44 is not large enough adequately to drive the plurality of mercury contact relays 66, 68, 70, 72, and 74, and, therefore, the plurality of power pentodes 56, 58, 60, 62, and 64 are interposed between these multivibrators and the plurality of mercury contact relays. However, these pentodes do not provide satisfactory class C operation unless they are driven from a relatively low impedance source. As explained hereinabove, the plate impedance of the frequency dividing multivibrators is rather high in order to maintain adequate stability of operation thereof and, accordingly, the plurality of buffer amplifiers 46, 48, 50, 52, and 54 are interposed between the multivibrators and the power pentodes to provide a low impedance driving source for these pentodes.

More specifically, the 50 C. P. S. voltage developed by the multivibrator 36 is directly transmitted from the control grid of the tube 138 through a conductor 176 to the control grid of the buffer amplifier 46. The buffer amplifier 46 is provided with a plate resistor 178 which is of a relatively low magnitude so that the grid of the power pentode 58 is energized from a relatively low impedance source. The plate of the power pentode 58 is directly connected through a conductor 180 to the operating winding of the mercury contact relay 72, the other side of the operating winding of which is connected to the common ground conductor 132. A resistor 184 and a condenser 186 are connected in parallel with the operating winding of the relay 72 in order to provide surge current protection for the operating winding of this relay. The resistor 184 and the condenser 186 also modify the current waveform in the winding of the relay 72 so that the operation of the relay 72 under the control of the power pentode 58 is improved.

The 66⅔ C. P. S. voltage generated by the frequency dividing multivibrator 40 is directly coupled from the control grid of the tube 154 through a conductor 188 to the control grid of the buffer amplifier 50. The buffer amplifier 50 together with a plate resistor 190 therefor provide a low impedance source for driving the power pentode 56 through a condenser 192. The anode of the pentode 56 is directly connected to the operating winding of the mercury contact relay 74 through a conductor 194. The other side of the operating winding of the relay 74 is connected to the common ground conductor 132, and a resistor 196 and a condenser 198 are shunted across the operating winding of the relay 74 to provide surge current protection and to modify the waveform of the current in this winding.

The 33⅓ C. P. S. voltage developed by the frequency dividing multivibrator 44 is directly coupled to the control grid of the buffer amplifier 52 through a conductor 200. The amplifier tube 52 together with its plate resistor 202 provide a low impedance source for driving the control electrode of the power pentode 60 through a coupling condenser 204. The anode of the power pentode 60 is directly connected to the operating winding of the mercury contact relay 70 through a conductor 206. The other side of the operating winding of the relay 70 is connected to the common ground conductor 132, and a condenser 208 is shunted across this operating winding to provide surge current protection and to modify the waveform of the operating current passing therethrough.

The 25 C. P. S. voltage developed by the frequency dividing multivibrator 38 is coupled to the control electrode of the buffer amplifier tube 48 through a conductor 210. The amplifier 48 and its plate resistor 212 provide a low impedance source for driving the control grid of the power pentode 62 through a coupling condenser 214. The anode of the pentode 62 is directly connected to the operating winding of the mercury contact relay 68 through a conductor 216. The other side of the operating winding of the relay 68 is connected to the common ground conductor 132, and a condenser 218 is shunted across this operating winding to both modify the waveform of the operating current therefor and to provide surge current protection for the relay 68.

The 16⅔ C. P. S. voltage generated by the multivibrator 42 is directly connected to the grid of the buffer amplifier 54 which, together with its plate resistor 222, provides a low impedance source for driving the control grid of the power pentode 64 through a condenser 224. The anode of the pentode 64 is directly connected to the operating winding of the mercury contact relay 66 through a conductor 226, and the other side of the operating winding of this relay is connected to the common ground conductor 132. A condenser 228 is connected in parallel with the operating winding of the relay 66 to both modify the waveform of the current passing therethrough and to provide surge current protection.

Accordingly, each of the multivibrators 36, 38, 40, 42, and 44 operates one of the mercury contact relays 66, 68, 70, 72, and 74 through an interposed power pentode and a buffer amplifier. These relays are intermittently energized and deenergized inasmuch as the power pentodes are operated as class C amplifiers so that the current flow through the anode circuit thereof is interrupted during alternate half cycles of the substantially square wave signals developed by the plurality of multivibrators.

As shown schematically in Fig. 4 of the drawings, each of the mercury contact relays is provided with circuit making and breaking means for alternately interconnecting a source of potential with either of two pairs of contacts. It should be understood that since the relays 66, 68, 70, 72, and 74 are of the mercury contact type, the disclosure in Fig. 4 of the drawings of an armature alternately moved into engagement with either of the sets of contacts is merely schematic and that in actual operation the contacting function is performed by a movable mass of mercury. One type of mercury contact relay which operates satisfactorily in the electronic ringing machine is the type 275A manufactured by the Western Electric Company, although it should be understood that other similar types of relays can be adapted for use in the present invention.

In order to convert the intermittent operation of the plurality of mercury contact relays into voltages of suitable magnitude and frequency for use in selective ringing on party lines, a plurality of armatures 230, 232, 234,

236, and 238 are connected to the conventional negative 48 volt battery supply provided at a terminal 240 through a plurality of fuses 242, 244, 246, 248, and 250, respectively. The armature 230 controlled by the mercury contact relay 66 is normally in engagement with a pair of contacts 252 so that a circuit is completed from the negative battery supplied at the terminal 240 through the fuse 242, the armature 230, the contacts 252, a resistor 254, a normally closed pair of contacts 256 through one-half of the center-tapped primary winding 258 of the output transformer 76 to a filtered common ground conductor 260. The flow of current through this circuit induces a voltage in a secondary winding 262 of the transformer 76, and this induced voltage is coupled to an output terminal 264.

When the relay 66 is operated, the armature 230 is moved into engagement with a pair of contacts 266 to complete a circuit for energizing a lower portion of the center-tapped primary winding 258 of the output transformer 76 by means of a circuit including a resistor 268 and a normally closed pair of contacts 270. Accordingly, the alternate operation and release of the relay 66 intermittently energizes the two portions of the primary winding 258 of the output transformer 76 to induce a substantially pure square wave in the secondary winding 262 having a frequency of 16⅔ C. P. S. This generated voltage is applied to the output terminal 264 to provide a ringing voltage having a first one of the desired harmonically related ringing frequencies. In order to prevent the presence of undesired frequencies in the voltage coupled to the terminal 264, the secondary winding 262 of the transformer 76 is provided with a pair of condensers 272 and 274 which bypass radio frequency voltages to ground.

To provide surge current and arcing protection for the contacts 252, a resistor 276 and a condenser 278 are connected in series between the contact pairs 252 and 266, and to provide protection for the contacts 266, and a condenser 280 is interconnected between the armature 230 and the contacts 266.

It is possible that accidental jarring of the receptacle containing the mercury providing the contacts 252 and 266 will draw an arc between the armature 230 and either one of these contact pairs. The production of such an arc vaporizes the mercury so that the arc cannot be extinguished, and the switching ability of the relay 66 is thereby impaired. The resistances 268 and 254, which are of an extremely small magnitude such as 1 ohm, are connected in series between the contact pairs and the primary winding 258 of the output transformer 76 so that the current drawn from the armature 230 through either of the contact pairs 252 and 256 is limited by these resistors to the extent that an arc cannot be developed and maintained by the vaporization of the mercury. The serially connected resistors 254 and 268 are also useful in providing elements across which measurements of the contact current can be made.

When the electron ringing machine is in operation, it is often desirable to determine whether or not each of the plurality of mercury relays is functioning properly prior to associating the ringing machine with the telephone system. To provide a visual means for determining the operation of the mercury contact relay 66, an electric lamp 282 and a current limiting resistor 284 are connected in series between a common ground conductor 286 and the contact pair 252. A similar electric lamp 288 and a serially connected current limiting resistor 290 are interposed between the contact pair 266 and the common ground connector 286. Accordingly, when the armature 230 is intermittently moved into engagement with each of the contact pairs associated therewith, the lamps 282 and 288 are alternately energized thereby indicating that the armature 230 controlled by the relay 66 is properly operating.

The mercury contact relay 68, 70, 72, and 74 together with the contacts controlled thereby are normally interconnected with the output transformers 78, 80, 82, and 84 through a plurality of normally closed contacts 300, 302, 304, 306, 308, 310, 312, and 314, respectively, so as to generate square waves having the harmonically related frequencies of 25, 33⅓, 50, and 66⅔ C. P. S., respectively. The operating circuit associated with each of the mercury contact relays 68, 70, 72, and 74 is identical to that described hereinabove in conjunction with the description of the operation of the mercury contact relay 66.

To provide a means for removing undesirable ripple in the voltage provided in the plurality of primary windings associated with the output transformers 76, 78, 80, 82, and 84, a filtering network indicated generally as 316 is provided. This filtering network is connected to the common ground conductor 260 and includes a pair of filter condensers 318 and 320 and a pair of filter chokes 322 and 324.

The square waves generated by the plurality of mercury contact relays 66, 68, 70, 72, and 74, and the output transformers associated therewith are substantially pure square waves and, accordingly, include a large number of odd multiple harmonic frequencies. In the harmonic frequency ringing machine disclosed in Figs. 1 to 5 of the drawings, the third harmonic of the 16⅔ C. P. S. ringing frequency coincides with the fundamental frequency of the 50 C. P. S. ringing voltage. Assuming that the square wave of 16⅔ C. P. S. has an amplitude of 78.5 volts, the 50 C. P. S. third harmonic thereof will have a peak voltage of 33⅓ volts. This is true inasmuch as in a pure square wave the amplitude of the odd harmonics voltages is inversely proportional to their order. This amount of third harmonic voltage in the 16⅔ C. P. S. signal is large enough to induce cross ringing, i. e., the energization of the 50 C. P. S. ringer at one substation when the 16⅔ C. P. S. voltage is applied to the subscriber line to energize the 16⅔ C. P. S. ringer.

In order to prevent this cross ringing, a portion of the voltage developed in a secondary winding 326 of the output transformer 82 is returned through a conductor 328 and a switch 330 to the secondary winding 262 of the output transformer 76 in which is induced the 16⅔ C. P. S. signal. Since the magnitude of the ringing voltage induced in the secondary windings of all of the output transformers is approximately equal, the provision of a tap on the secondary winding 326, so that approximately one-third of the voltage generated therein is returned to the secondary winding 262 of the output transformer 76, provides a means for cancelling the undesired third harmonic in the output provided at the terminal 264. The magnitude of the third harmonic frequency voltage of the 16⅔ C. P. S. signal, assuming a square wave output of 78.5 volts, is approximately 33⅓ volts, and, assuming that the output amplitude of the 50 C. P. S. square wave provided in the secondary winding 326 is 78.5 volts, one-third of the sine wave fundamental frequency thereof, i. e., 100 volts peak, is equal to the amplitude of the undesired harmonic. This voltage is returned through the conductor 328 to produce cancellation not only of the undesired third harmonic of the 16⅔ C. P. S. voltage but also of the ninth and fifteenth harmonics inasmuch as the voltage returned from the secondary winding 326 also includes adequate amounts of the third and fifth harmonic of the 50 C. P. S. fundamental to cancel these other harmonics of the 16⅔ C. P. S. voltage. Accordingly, cross ringing in the electronic ringing machine is prevented by the simple expedient of providing a 33⅓ percent tap on the secondary of the 50 C. P. S. output transformer 82 to provide a voltage equal in magnitude and opposite in phase to that of the undesired harmonic frequency voltage generated in the secondary winding 262 of the 16⅔ C. P. S. output transformer 76.

More generally, the novel method of preventing cross ringing embodied in the multi-frequency voltage generator of the present invention utilizes means for combining or applying or adding 180 degrees out of phase, components of the generated voltages which are harmonically related or related by an integer in frequency. When the generated voltages are related in frequency so that one of the ringing frequencies includes one or more harmonically related frequencies which coincide with a higher ringing frequency in the selected series of ringing frequencies, a proportion of the square wave voltage generated at the higher frequency which is equal to the reciprocal of the integer representing the order of the coincident harmonic of the lower frequency is applied to the source of the lower frequency voltage to cancel this undesired harmonic frequency voltage, thereby to prevent cross ringing. In the example described above, the third harmonic, or third order harmonic, of the 16⅔ C. P. S. ringing frequency coincides with the 50 C. P. S. ringing frequency. Accordingly, one-third of the output of the 50 C. P. S. generator is applied to the source of the 16⅔ C. P. S. voltage to cancel the 50 C. P. S. harmonic content thereof. Assuming that one of the decimonic series of ringing frequencies is to be used, i. e., 20, 30, 40, 50, and 60 C. P. S., one-third of the 60 C. P. S. voltage generated would be returned to the source of the 20 C. P. S. voltage to cancel the third order harmonic content thereof, which third harmonic frequency coincides with the 60 C. P. S. ringing frequency.

The present method of and means for adding or combining the voltage components to prevent cross ringing is cheaply and easily accomplished by the provision of a tap on the secondary winding of all of the output transformers 76, 78, 80, 82, and 84, which taps provide means for obtaining one-third of the voltage developed in these secondary windings. Since the range of frequencies used for selective party ringing in telephone systems is small, and since the square waves generated include only the odd harmonic frequencies, the only possible coincidence between a ringing frequency voltage and a voltage of a harmonic of a lower ringing frequency having sufficient amplitude to produce cross ringing would be the third order harmonic of the lower ringing frequency. Accordingly, the provision of only a single tap on each of the output transformers for obtaining one-third of the generated output voltage thereof is adequate to permit the same standardized output transformer to be used for all of the different series of selective ringing frequencies.

To place the electronic ringing machine in operation, a ringing control circuit 340 applies ground to a conductor 342 so as to operate a start relay 344. The operation of the start relay 344 closes the contacts 92 and 108, and also closes a plurality of contacts 182 and 346. The closure of the contacts 92 and 108 interconnects the tuning fork assembly 30 with the standard frequency oscillator 32 so as to initiate operation of this oscillator. The closure of the contacts 182 connects ground to the common ground conductor 132. The application of ground to the conductor 132 prepares the operating circuits for the plurality of mercury contact relays 66, 68, 70, 72, and 74, and also prepares the plurality of buffer amplifiers, multivibrators and power pentodes for operation under the control of the standard frequency oscillator 32. Since the cathodes of all of these tubes are maintained at negative 48 volts, the application of ground to the plates thereof provides the same result as applying a positive B+ potential to these plates. Accordingly, the closure of the contacts 182 prepares the electronic ringing machine for operation and initiates the intermittent operation of the mercury contact relays under the control of the plurality of frequency dividing multivibrators. However, the operation of the mercury contact relays does not provide an output of ringing frequency voltages inasmuch as the output transformers are not connected to the contacts controlled by these relays.

The closure of the contacts 346 prepares a path extending through the ringing control circuit 340 for energizing an output relay 348. The operation of the output relay 348 to interconnect the mercury contact relays with the plurality of output transformers is delayed inasmuch as, if the mercury contact relays are not properly operating, and if the filaments of the vacuum tubes forming the electronic ringing machine are not heated, the closure of a plurality of contacts 256, 270, 300, 302, 304, 306, 308, 310, 312, and 314 controlled by the relay 348 would produce a large surge current through the mercury contacts so that one of the fuses 242, 244, 246, 248, and 250 may become opened.

In order to provide a suitable time delay for insuring the adequate heating of the tube filaments and, accordingly, the proper operation of the plurality of mercury contact relays, means controlled by operation of the mercury contact relays for rendering the ringing machine ineffective to supply output pulses including a starting delay tube 350 (Fig. 1) is provided. One side of the filament of the twin triode tube 350 is connected to ground, and the other side of the filament of the tube 350 is connected through a conductor 353, a normally closed pair of contacts 354, and a current dropping resistor 356 to a pair of front contacts 358 controlled by the mercury contact relay 68. The intermittent engagement of the armature 232 with the contacts 358 under the control of the intermittent energization of the relay 68 extends the previously described circuit for the filament of the tube 350 through the fuse 244 to the negative battery terminal 240.

This circuit energizes the filament of the starting delay tube 350 so that after a predetermined time sufficient for all of the mercury contact relays to reach a proper operating condition, the filament of the tube 350 becomes heated so as to permit conduction from the connected cathodes thereof to the anodes of the tube 350. The flow of current through the tube 350 completes a circuit extending through a conductor 360 for energizing a delay relay 362. The operation of the delay relay opens the contacts 354 and closes a plurality of contacts 364 and 366. The closure of the contacts 366 interconnects the operating winding of the relay 362 with the negative battery terminal 240 through a fuse 370 and a current limiting resistor 372. This locking circuit maintains the delay relay 362 operated until such time as negative potential is removed from the terminal 240 thereby to terminate operation of the electronic ringing machine.

The opening of the contacts 354 interrupts the circuit extending to the filament of the starting delay tube 350 so that the conduction through this tube is extinguished. The relay 362 is not released, however, in response to the termination of conduction through the tube 350 because of the previous completion of the locking circuit for this relay.

The closure of the contacts 364 completes the previously prepared circuit for energizing the output relay 348 by means of a circuit which extends from ground in the ringing control circuit 340 through the closed contacts 346 and 364, a conductor 347, through the ringing control circuit 340, and thence to the operating winding of the relay 348 through a conductor 345. The operation of the output relay 348 closes the plurality of contacts 256, 270, 300, 302, 304, 306, 308, 310, 312, and 314 so that the contacts controlled by the plurality of mercury contact relays are interconnected with the primary windings of the plurality of output transformers.

Accordingly, the time delay circuit provided by the tube 350 and the relay 362 prevents the interconnection of the output transformers with the remainder of the electronic ringing machine until such time as the plurality of mercury contact relays have properly attained their normal operating condition so as to prevent the inadvertent opening of one of the plurality of individual fuses associated with the armatures controlled by each of these relays.

If it is desired to check the operation of the ringing machine during the periods of time in which an additional electronic ringing machine is supplying ringing voltages for the telephone system, the operation of the machine may be initiated by closing a manually controlled switch 380. The closure of the switch 380 applies ground to the start relay 344 so that the contacts controlled thereby are closed. Ground is also applied, following the time delay introduced by the tube 350, through the contacts 346 and 364 to the ringing control circuit 340. However since another electronic ringing machine is supplying the requirements of the telephone system, the conductors 347 and 345 are not interconnected by the circuit 340 and, accordingly, the output relay 348 is not operated to interconnect the output transformers with the remainder of the ringing machine. This permits the inspection of the operation of the electronic ringing machine in an installed position without supplying generated voltages to the telephone system. Obviously, when the manually controlled switch 380 is opened, the start relay 344 is released. The time delay relay 362 may be released by temporarily removing battery from the terminal 240.

Since it is necessary to maintain a continuously operative source of ringing voltages in the telephone system, and since the failure of one of the fuse elements 242, 244, 246, 248, 250, or 370 would disable the electronic ringing machine from supplying either all or any particular one of the ringing voltages, an auxiliary electronic ringing machine 402 is provided. The fuses listed above are of the "grasshopper" type so that, upon release of any one of these fuses, one of a plurality of switch elements 382, 384, 386, 388, 390, or 392 is moved into engagement with one of a plurality of contacts common to an alarm conductor 394. The engagement of one of the switch elements with the alarm conductor 394 completes a circuit extending from the negative battery terminal 240 through the released switch element to an electric signal lamp 396 which is shunted by a resistor 398 and thence to a terminal 400 which is connected to the ringing control circuit 340. The application of negative battery to the electric lamp 396 illuminates the lamp to provide a visible indication of the fact that one of the fuses has released, and the application of negative battery to the terminal 400 energizes the ringing control circuit 340 to connect the electronic ringing machine 402 to, and to disconnect the improperly operating ringing machine from the system.

More particularly, in response to the application of negative battery to the terminal 400, the ringing control circuit 340 removes ground from the conductor 342 so that the start relay 344 is released to open the contacts 182, 346, 108, and 92. The opening of the contacts 92 and 108 disconnects the standard frequency oscillator 32 from the tuning fork assembly 30. Incident to the removal of ground from the conductor 342, the ringing control circuit 340 applies ground to a similar conductor associated with the electronic ringing machine 402 so that this machine is placed in operation under the control of the tuning fork assembly 30.

The opening of the contact 346 interrupts the circuit for energizing the output relay 348 so that this relay releases to disconnect the plurality of output transformers from the circuits controlled by the mercury contact relays. The opening of the contacts 182 removes operating ground from the plurality of electronic components forming the electronic ringing machine so that the circuits therein are rendered inoperative.

In the event that one of the fuses associated with the armatures controlled by the mercury relays is released, the delay relay 362 remains locked up by virtue of the locking circuit extending from ground through the fuse element 370 to the negative battery terminal 240. It is not necessary to release the delay relay 263 when one of the armature fuses is released inasmuch as the filaments of the tubes in the electronic ringing machine remain heated. However, if the fuse element 370 is released, ground is removed from the common negative battery conductor 110 so that all of the filaments in the ringing machine become cooled. The removal of negative battery from the common conductor 110 also releases the delay relay 362 inasmuch as the battery is removed from the locking circuit therefor.

The release of the delay relay 362 opens the contacts 364 and 366 and closes the contacts 354. The closure of the contacts 354 re-establishes the circuit extending to the filament of the starting delay tube 350 so that when this ringing machine is next energized, a suitable time delay is interposed prior to the operation of the output relay 348. The opening of the contacts 366 opens the holding circuit for the delay relay 362 and the opening of the contacts 364 interrupts the circuit extending to the output relay 348 through the ringing control circuit 340.

Although the electronic ringing machine, disclosed and described in Figs. 1 to 5 of the drawings, is shown as being of the harmonic ringing frequency type, the machine may easily be converted for use in generating either a synchromonic series of ringing frequencies, in which the frequencies are not harmonically related to each other, or to provide a decimonic series of ringing frequencies in which the ringing frequencies are related to each other in being integral multiples of ten. This conversion is easily accomplished by replacing the frequency dividing multivibrators 34, 36, 38, 40, 42, and 44 with similar multivibrators adapted to provide the necessary frequencies for the desired series of ringing frequencies. The copending application of John L. Wheeler, Serial No. 348,907, filed April 15, 1953, and entitled Multi-Frequency Voltage Generator, now Patent No. 2,679,014, discloses a means for deriving both synchromonically and decimonically related frequencies. By the substitution of these multivibrators, when adapted for use with the 48 volt battery supply, the electronic ringing machine disclosed herein may be easily converted for use in generating either of these desired series of ringing frequencies.

In the event that the ringing machine is adapted for use in supplying ringing voltages of the decimonic series, the output transformers 76, 78, 80, 82, and 84 are provided with voltages having frequencies of 20, 30, 40, 50, and 60 C. P. S., respectively. In the decimonic series, the third harmonic of the 20 C. P. S. voltage provided at the transformer 76 is equal to the fundamental of the ringing frequency of 60 C. P. S. developed in the output transformer 84. Therefore, to prevent cross ringing, the switch 330 is moved into engagement with a contact 410 which is connected through a conductor 412 to a 33⅓ percent tap on a secondary winding 414 of the output transformer 84. By means of the tapped secondary winding 410, approximately one-third of the voltage developed therein is returned through the conductor 414 and the switch 330 to the secondary winding 262 of the 20 C. P. S. output transformer 76. This voltage produces cancellation of the third harmonic of the 20 C. P. S. voltage developed in the output transformer 76 and, accordingly, prevents cross ringing when the electronic ringing machine is utilized to generate the ringing voltages of the decimonic series.

When the electronic ringing machine is converted for use in providing ringing voltages in the synchromonic series wherein the ringing voltages are not harmonically related to one another, the manual switch 330 is moved into engagement with the contact 416 which is directly connected to the common battery conductor. Since none of the ringing frequencies are harmonically related, the problem of preventing cross ringing between different ringing frequencies is not presented.

It is to be understood that the above described embodiments of the invention are merely illustrative of the principles thereof and that numerous other modifications may be devised by those skilled in the art which will fall within the scope and spirit of these principles.

What is claimed and desired to be secured by Letters Patent of the United States is:

1. An apparatus for generating a telephonic ringing signal comprising electronic means for generating a voltage having a first output frequency, relay means operated by said first frequency voltage, means controlled by said relay means for producing a substantially square wave output voltage of said first frequency, and means controlled by said relay means for normally rendering the producing means ineffective to produce said output voltage and responsive to proper steady state operation of said relay means for then rendering said producing means effective after a delay interval to produce said output voltage.

2. An apparatus for generating a telephonic ringing signal comprising a voltage generator having an output voltage of a first frequency, relay means operated by said output voltage in accordance with the frequency thereof, a transformer including input and output means, a source of potential, contact means controlled by the relay for intermittently applying the potential to the input means of the transformer, and means controlled by said relay means for normally preventing said application of the potential to the input means and responsive to proper steady state operation of the relay means in accordance with the output voltage of said generator.

3. An apparatus for generating a telephonic ringing signal comprising a voltage generator having an output voltage of a first frequency, relay means operated by said output voltage in accordance with the frequency thereof, a transformer including input and output means, a source of potential, contact means controlled by the relay means for intermittently applying the potential to said input means to provide square waves of said first frequency at said output means, means for disconnecting the contact means from the input means, and means controlled by proper steady state operation of said relay means by said output voltage for rendering the disconnecting means ineffective so that said contact means are connected to said input means.

4. An apparatus for generating a telephonic ringing signal comprising electron valve means for generating a voltage having a fixed output frequency, relay means operated in accordance with said fixed frequency voltage, means controlled by said relay means for producing waves of said fixed frequency, means for initiating operation of said relay means, and means controlled by said relay means and responsive to proper steady state operation of said relay means at said fixed frequency for initiating operation of said producing means under the control of said relay means after a time interval following the initiation of the operation of the relay means.

5. A multiple frequency generator comprising a standard frequency source having a standard frequency voltage output, a plurality of frequency dividing multivibrators controlled by said standard frequency voltage to provide a plurality of different frequency output voltages, a plurality of power amplifier tubes, an impedance changing means interposed between each of the multivibrators and the power amplifier tubes to control the operation of the power amplifier tubes in accordance with the different frequency voltages, a plurality of square wave generating means including relay means controlled by the power amplifier tubes for generating square waves in accordance with said different frequencies, two of said generating means providing square waves related in frequency to each other by an integer, and means interconnecting said two generating means for preventing cross ringing between said two related frequency square waves.

6. An apparatus for generating a telephonic ringing signal comprising means for generating a driving voltage of a desired ringing frequency, ringing signal generating means operated in accordance with said driving voltage to generate a ringing signal of said frequency, said signal generating means including both output means and relay means operated by said driving voltage and having contact means, and means operated by proper steady state operation of said contact means for subsequently rendering said contact means effective to control said output means.

7. The apparatus set forth in claim 6 in which the means for rendering the contact means effective to control the output means includes electronically controlled means operated by sustained intermittent operations of said contact means for a predetermined period of time.

References Cited in the file of this patent

UNITED STATES PATENTS

| | | |
|---|---|---|
| 942,091 | Manson | Dec. 7, 1909 |
| 1,543,836 | Field | June 30, 1925 |
| 1,555,893 | Thompson | Oct. 6, 1925 |
| 1,972,268 | Lesh | Sept. 4, 1934 |
| 2,041,368 | O'Hagan | May 19, 1936 |
| 2,050,599 | Barton | Aug. 11, 1936 |
| 2,073,701 | Lassarini | Mar. 16, 1937 |
| 2,549,505 | Mohr | Apr. 17, 1951 |
| 2,667,632 | Grandstaff | Jan. 26, 1954 |
| 2,696,737 | Mittelmann | Dec. 14, 1954 |

UNITED STATES PATENT OFFICE
CERTIFICATE OF CORRECTION

Patent No. 2,834,954 May 13, 1958

Robert B. Trousdale

It is hereby certified that error appears in the printed specification of the above numbered patent requiring correction and that the said Letters Patent should read as corrected below.

Column 2, line 60, for "shematic" read -- schematic"; line 61, for "empodying" read -- embodying --; column 3, line 10, for "contacts" read -- contact --; column 13, line 30, after "generator" and before the period insert -- for then applying said potential to said input means after a time delay --.

Signed and sealed this 17th day of February 1959.

(SEAL)
Attest:

KARL H. AXLINE
Attesting Officer

ROBERT C. WATSON
Commissioner of Patents